(12) United States Patent
Wu et al.

(10) Patent No.: US 11,683,587 B2
(45) Date of Patent: Jun. 20, 2023

(54) CAMERA DEVICE WITH OPTICAL IMAGE STABILIZATION

(71) Applicant: Lanto Electronic Limited, Kunshan (CN)

(72) Inventors: Fu-Yuan Wu, Taipei (TW); Tao-Chun Chen, Taipei (TW); Wen-Yen Huang, Taipei (TW); Meng-Ting Lin, Taipei (TW); Shang-Yu Hsu, Taipei (TW)

(73) Assignee: Lanto Electronic Limited, Kunshan (CN)

( * ) Notice: Subject to any disclaimer, the term of this patent is extended or adjusted under 35 U.S.C. 154(b) by 8 days.

(21) Appl. No.: 17/581,429

(22) Filed: Jan. 21, 2022

(65) Prior Publication Data
US 2022/0377240 A1   Nov. 24, 2022

(30) Foreign Application Priority Data

May 20, 2021   (CN) .......................... 202110550472.4

(51) Int. Cl.
*H04N 23/68* (2023.01)
*G02B 27/64* (2006.01)
*G03B 5/00* (2021.01)

(52) U.S. Cl.
CPC ......... *H04N 23/687* (2023.01); *G02B 27/646* (2013.01); *G03B 5/00* (2013.01); *G03B 2205/0015* (2013.01)

(58) Field of Classification Search
CPC .............. G03B 5/00; G03B 2250/0015; H04N 23/685; H04N 23/687; G02B 27/646
See application file for complete search history.

(56) References Cited

U.S. PATENT DOCUMENTS

| | | | |
|---|---|---|---|
| 2008/0187301 A1* | 8/2008 | Takahashi | G03B 5/00 396/55 |
| 2020/0344417 A1 | 10/2020 | Xu et al. | |
| 2021/0109421 A1 | 4/2021 | Yu | |
| 2021/0278692 A1* | 9/2021 | Kasahara | G02B 7/02 |

(Continued)

FOREIGN PATENT DOCUMENTS

| | | |
|---|---|---|
| CN | 204761268 U | 11/2015 |
| CN | 105573014 A | 5/2016 |

(Continued)

*Primary Examiner* — Christopher E Mahoney
(74) *Attorney, Agent, or Firm* — Birch, Stewart, Kolasch & Birch, LLP

(57) ABSTRACT

The present disclosure provides a camera device with optical image stabilization, comprising: a base, a first carrying member, a camera module, a first optical compensating component, a second optical compensating component, and a guiding component. The first carrying member is slidably assembled to the base. The second carrying member is movably assembled to the first carrying member. The first force interaction member and the second force interaction member are configured to be force-interacted. The second optical compensating component comprises a third force interaction member disposed on the base and a fourth force interaction member disposed on the first carrying member. The guiding component is connected with the base and the first carrying member. The third force interaction member and the fourth force interaction member are configured to be force-interacted.

15 Claims, 12 Drawing Sheets

(56) References Cited

U.S. PATENT DOCUMENTS

| | | | |
|---|---|---|---|
| 2022/0182514 A1* | 6/2022 | Shen | H04N 23/685 |
| 2022/0279093 A1* | 9/2022 | Kwon | H04N 23/58 |
| 2022/0373865 A1* | 11/2022 | Wu | H04N 23/55 |

FOREIGN PATENT DOCUMENTS

| | | |
|---|---|---|
| CN | 105785549 A | 7/2016 |
| CN | 107219805 A | 9/2017 |
| CN | 207424398 U | 5/2018 |
| CN | 108169869 A | 6/2018 |
| CN | 207718060 U | 8/2018 |
| CN | 208143351 U | 11/2018 |
| CN | 110780509 A | 2/2020 |
| CN | 210431574 U | 4/2020 |
| CN | 111812911 A | 10/2020 |
| CN | 112822363 A | 5/2021 |
| TW | M580024 U | 5/2016 |
| TW | I615651 B | 2/2018 |
| WO | WO 2015/147385 A1 | 10/2015 |

\* cited by examiner

CAMERA DEVICE WITH OPTICAL IMAGE STABILIZATION

CROSS-REFERENCE TO RELATED APPLICATION

This application claims the priority benefit of Chinese Patent Application Serial Number 202110550472.4, filed on May 20, 2021, the full disclosure of which is incorporated herein by reference.

BACKGROUND

Technical Field

The present disclosure relates to the technical field of camera devices with optical image stabilization, particularly to a camera device with optical image stabilization equipped with a five-axis image stabilizer different from a conventional four-axis image stabilizer, which rotates the lens around an axis parallel to the optical axis for shake compensation.

Related Art

Camera devices are often equipped with image stabilizer compensating for handshake for clear image when shooting. Conventional camera device with optical image stabilizer could only compensate for shake on four axes, which are linear movement in X-axis and Y-axis orthogonal to the optical axis of the lens, pitch with the X-axis, and yaw with the Y-axis. However, it is still unable to compensate for handshake in a direction parallel to the optical axis of the lens (Z-axis).

SUMMARY

The embodiments of the present disclosure provide a camera device with optical image stabilization tended to solve the problem that the handshake in a direction parallel to the optical axis of the lens (Z-axis) cannot be compensated.

The present disclosure provides a camera device with optical image stabilization, comprising: a base, a first carrying member, a camera module, a first optical compensating component, a second optical compensating component, and a guiding component. The first carrying member is slidably assembled to the base. The second carrying member is movably assembled to the first carrying member. The camera module comprises an optical lens and an image sensor carried on the second carrying member. The first optical compensating component comprises a first force interaction member disposed on the first carrying member and a second force interaction member disposed on the second carrying member. The first force interaction member and the second force interaction member are configured to be force-interacted, allowing the second carrying member to move relative to the first carrying member to optically compensate for the optical lens. The second optical compensating component comprises a third force interaction member disposed on the base and a fourth force interaction member disposed on the first carrying member. The guiding component is connected with the base and the first carrying member. The third force interaction member and the fourth force interaction member are configured to be force-interacted, allowing the first carrying member to be guided by the guiding component to move on the base around an axis parallel to an optical axis of the optical lens to optically compensate for the optical lens.

In the embodiments of the present disclosure, in the camera device with optical image stabilization, the second carrying member that carries the optical lens could move along the first axis or/and the second axis intersecting with the optical axis of the optical lens to compensate for the optical lens through the first optical compensating component, allowing the optical lens to move and rotate in and about the first axis and/or the second axis to realize a four-axis image compensation. The first carrying member is guided by the guiding component to rotate about the third axis parallel to the optical axis of the optical lens for the fifth axis image compensation through the second optical compensating component. Thus, in the present disclosure, images with excellent image quality can be output with a better image stabilization performed through extra compensation for the lens about additional axis than conventional four-axis image compensation.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
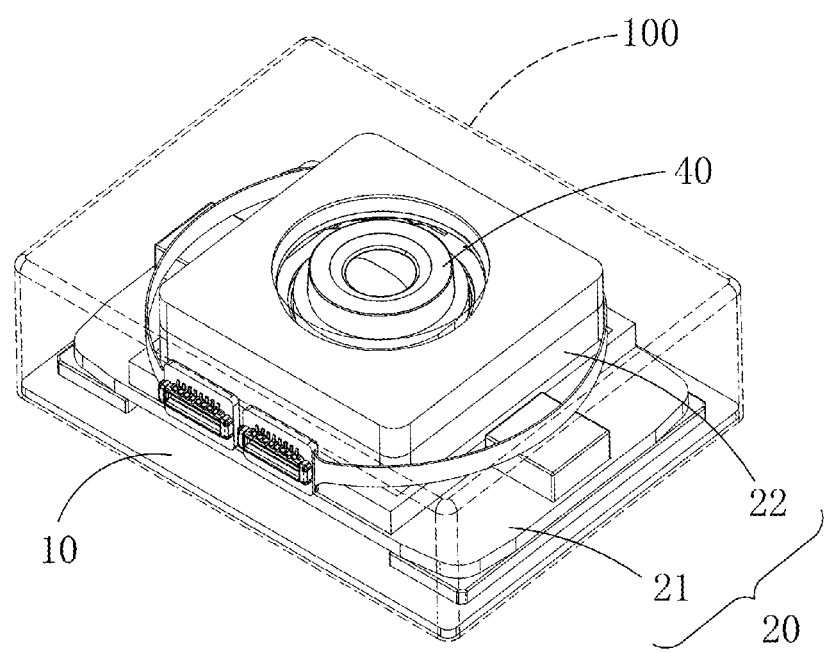
FIG. 1 is a perspective view of a camera device with optical image stabilization of an embodiment of the present disclosure.
Figure 2:
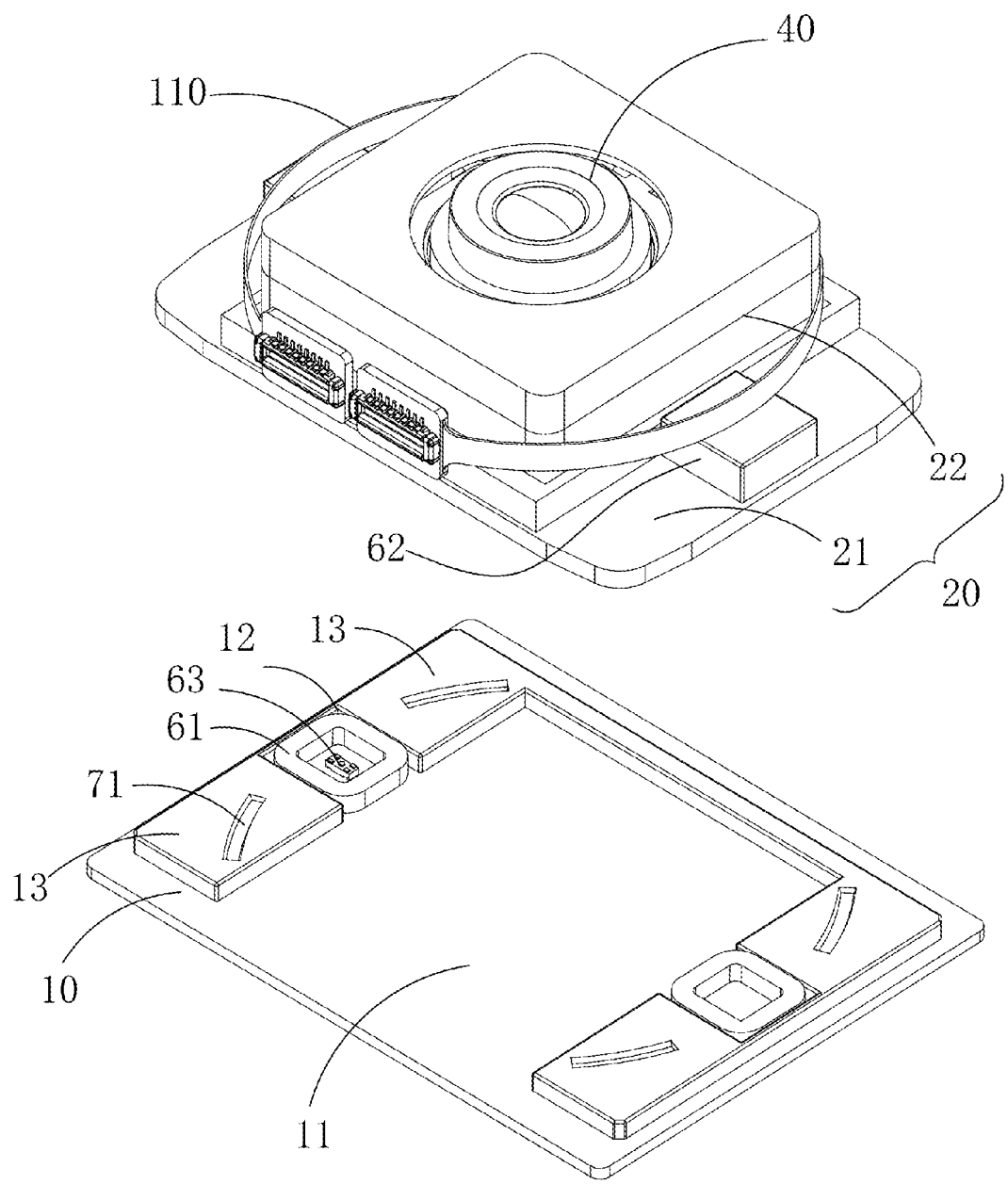
FIG. 2 is a partially exploded view of the camera device with optical image stabilization of FIG. 1.
Figure 3:
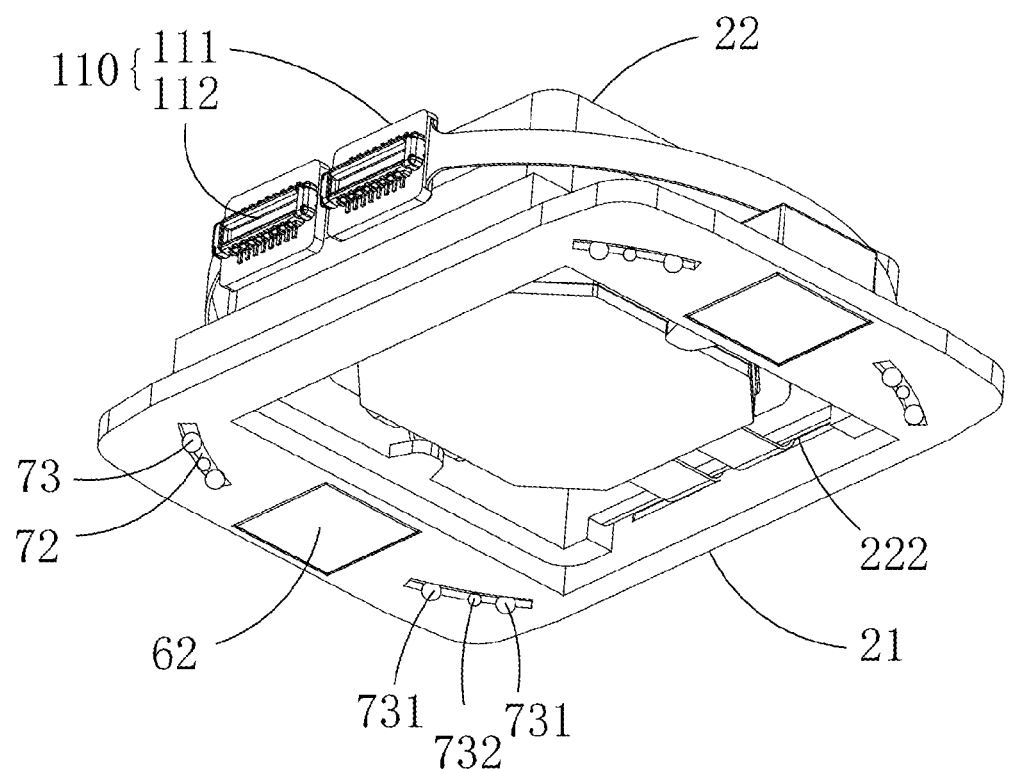
FIG. 3 is a partially exploded view in another angle of view of the camera device with optical image stabilization of FIG. 1.
Figure 3:
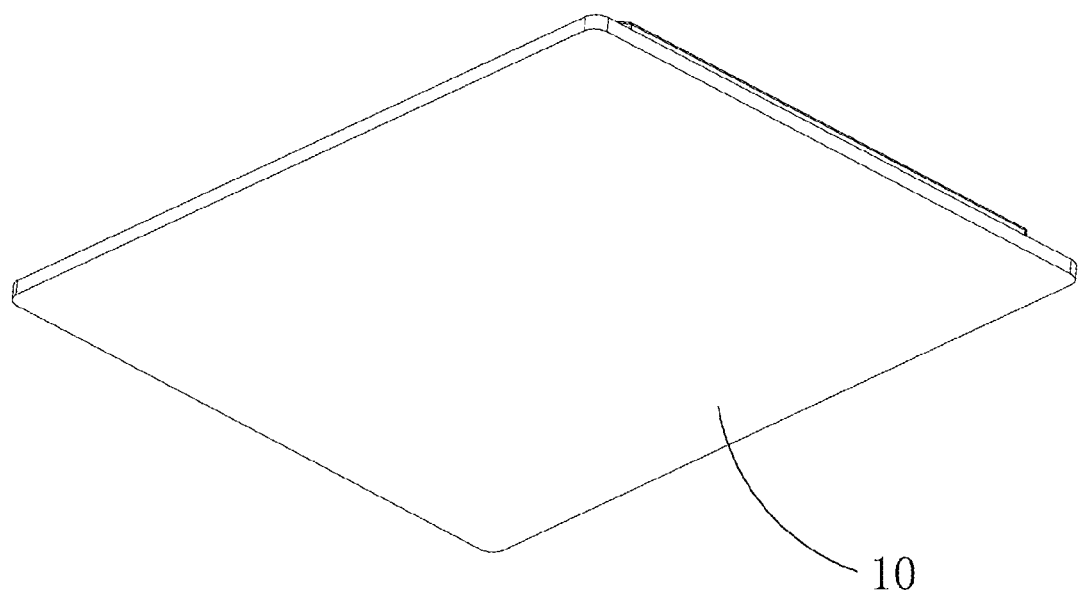
Figure 4:
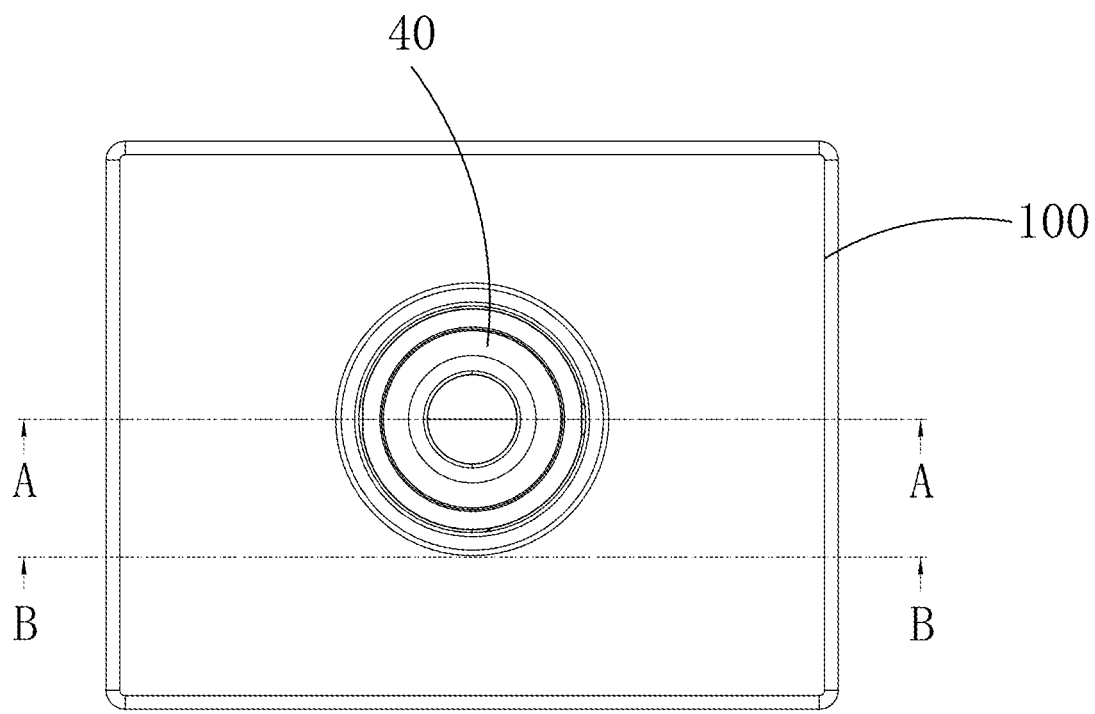
FIG. 4 is a top view of the camera device with optical image stabilization of FIG. 1.
Figure 5:
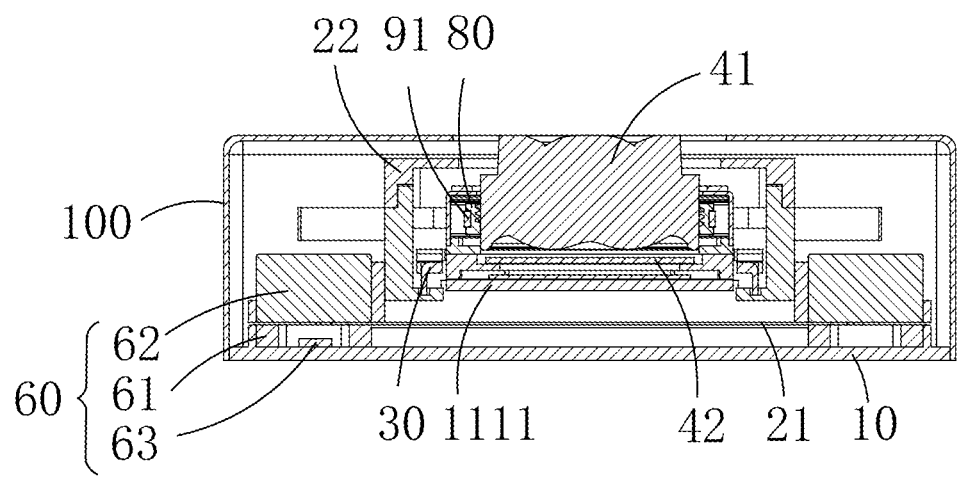
FIG. 5 is a cross-sectional view along line A-A of FIG. 4.
Figure 6:
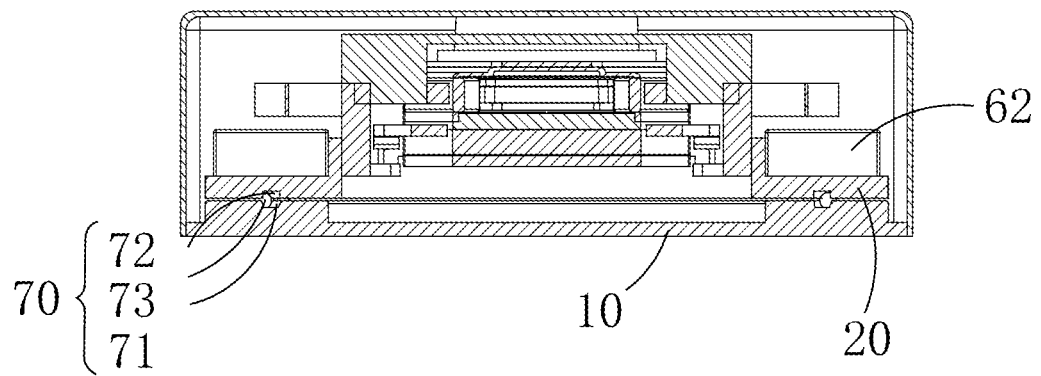
FIG. 6 is a cross-sectional view along line B-B of FIG. 4.

FIG. 1 is a perspective view of a camera device with optical image stabilization of an embodiment of the present disclosure. FIG. 2 is a partially exploded view of the camera device with optical image stabilization of FIG. 1. FIG. 3 is a partially exploded view in another angle of view of the camera device with optical image stabilization of FIG. 1. FIG. 4 is a top view of the camera device with optical image stabilization of FIG. 1. FIG. 5 is a cross-sectional view along line A-A of FIG. 4. FIG. 6 is a cross-sectional view along line B-B of FIG. 4. As shown in the figures, in this embodiment, the camera device with optical image stabilization 1 comprises a base 10, a first carrying member 20, a second carrying member 30, a camera module 40, a first optical compensating component 50, a second optical compensating component 60, and a guiding component 70. The camera device with optical image stabilization 1 further comprises a third carrying member 80 and an autofocus component 90.

In this embodiment, the first optical compensating component 50 allows the camera module 40 to be moving linearly or rotate on a first axis and/or a second axis intersecting with an optical axis of the camera module 40 to perform a four-axis optical compensation for the camera module. The second optical compensating component 60 and the guiding component 70 rotate the camera module 40 around a third axis parallel to the optical axis of the camera module 40 to realize a fifth-axis optical compensation for the camera module 40.

As shown in FIG. 2, FIG. 3, FIG. 5, and FIG. 6, the camera module 40 and the second carrying member 30 carrying the camera module 40 are both disposed on the first carrying member 20. The guiding component 70 is disposed between the first carrying member 20 and the base 10. The second optical compensating component 60 is disposed on the base 10 and the first carrying member 20. The second optical compensating component 60 drives the first carrying member 20 to rotate about the third axis L3 parallel to the camera module 40 on the base 10 through the guiding component 70. As shown in FIG. 5, the camera module 40 comprises an optical lens 41 and an image sensor 42 disposed on the second carrying member 30. External light is imaged on the image sensor 42 through the optical lens 41 and is converted into an image signal.

Figure 7:
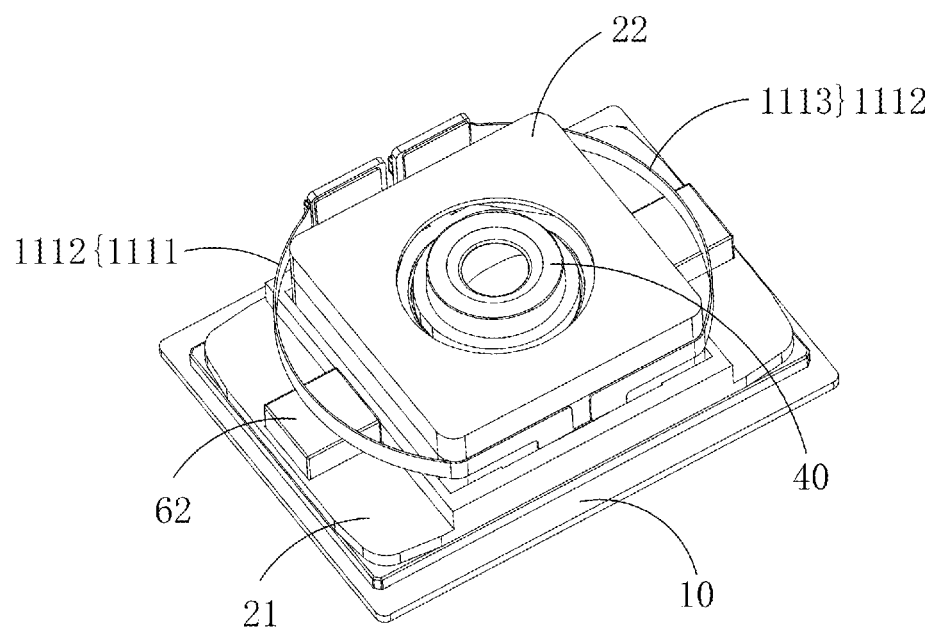
FIG. 7 is a perspective view of the camera device with optical image stabilization of FIG. 1 with the base and the housing removed.
Figure 8:
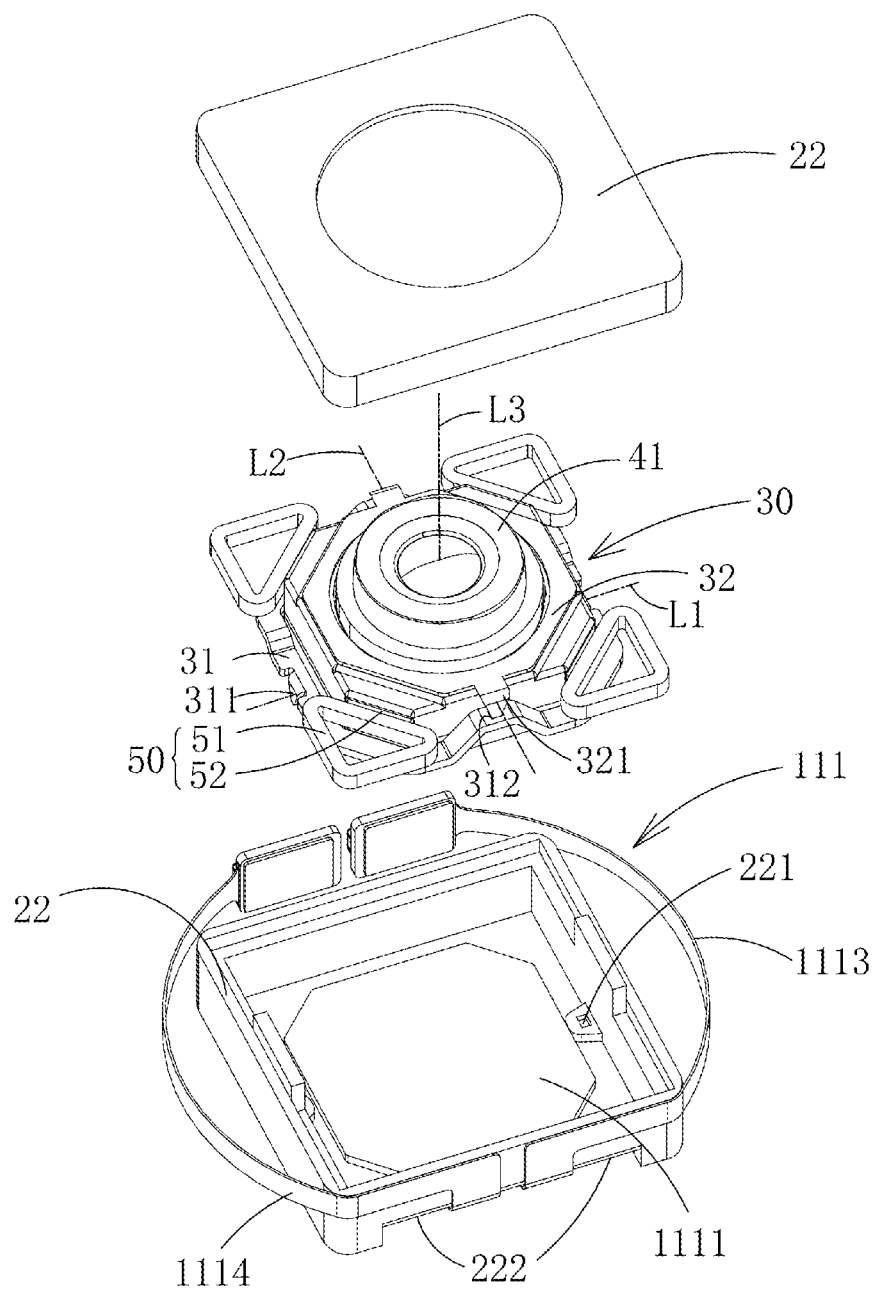
FIG. 8 is a partially exploded view of FIG. 7.
Figure 9:
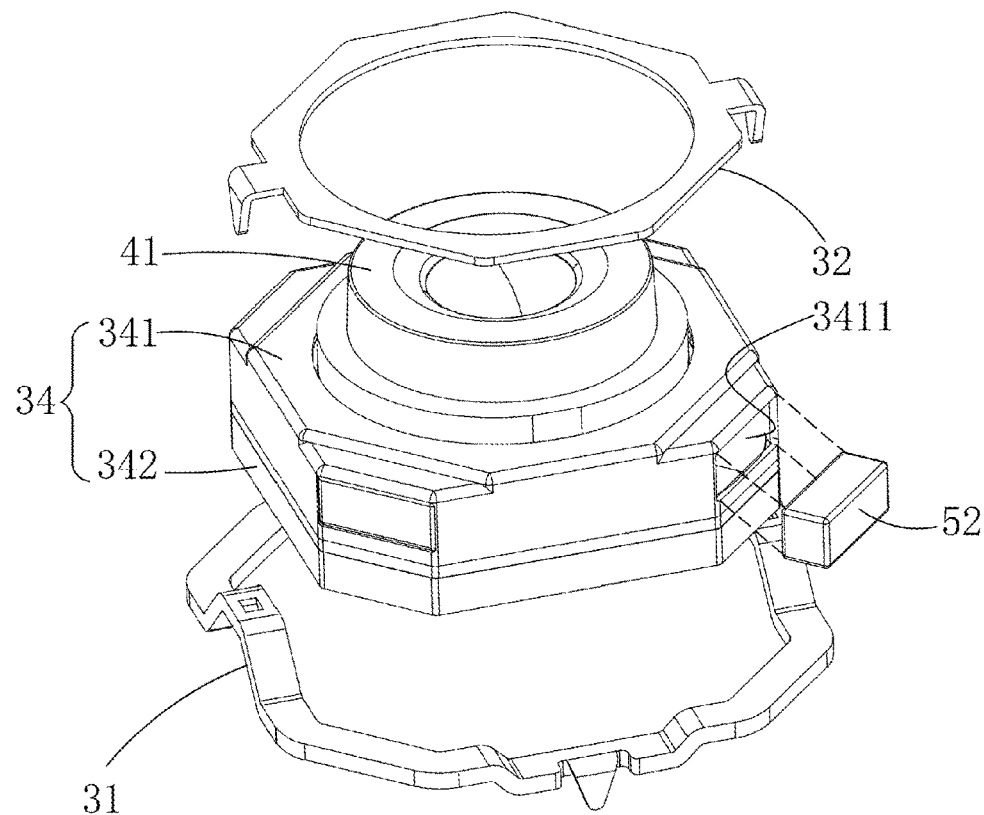
FIG. 9 is a perspective view of the camera device with optical image stabilization of FIG. 7 with the frame body and the flexible circuit board removed.
Figure 10:
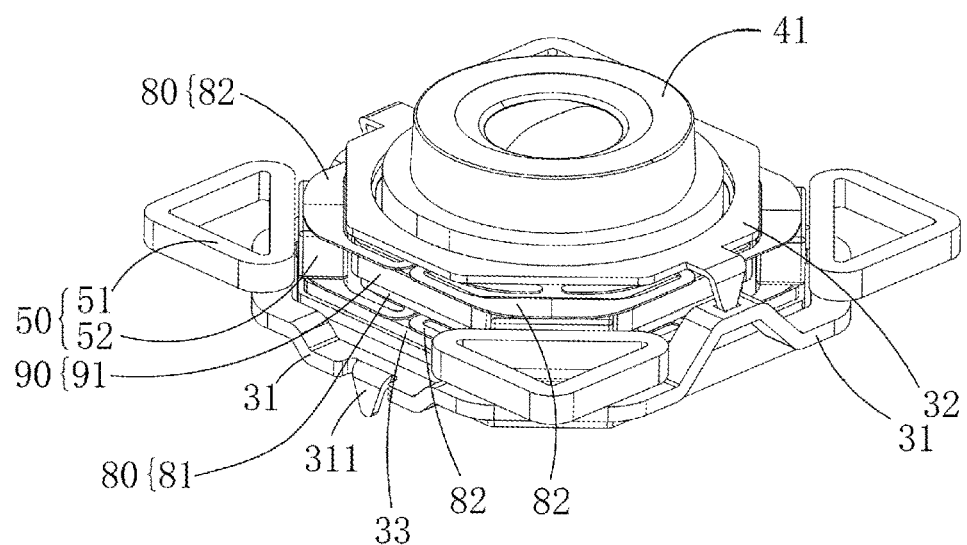
FIG. 10 is a perspective view of the camera device with optical image stabilization of FIG. 9 with the camera module carrying base removed.
Figure 11:
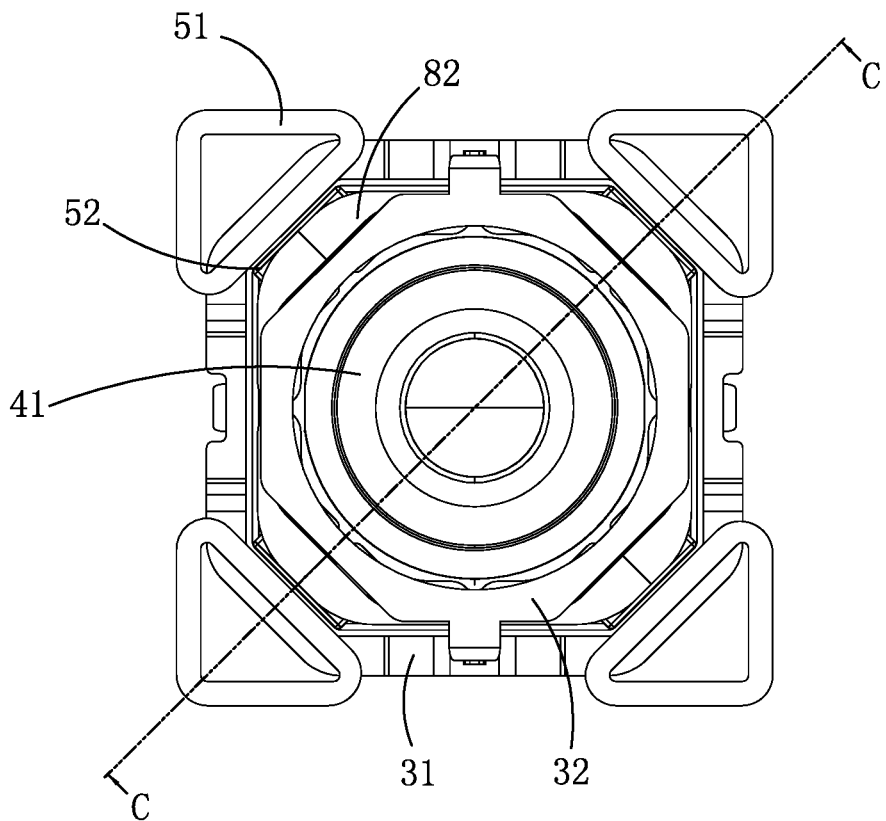
FIG. 11 is a top view of FIG. 9.
Figure 12:
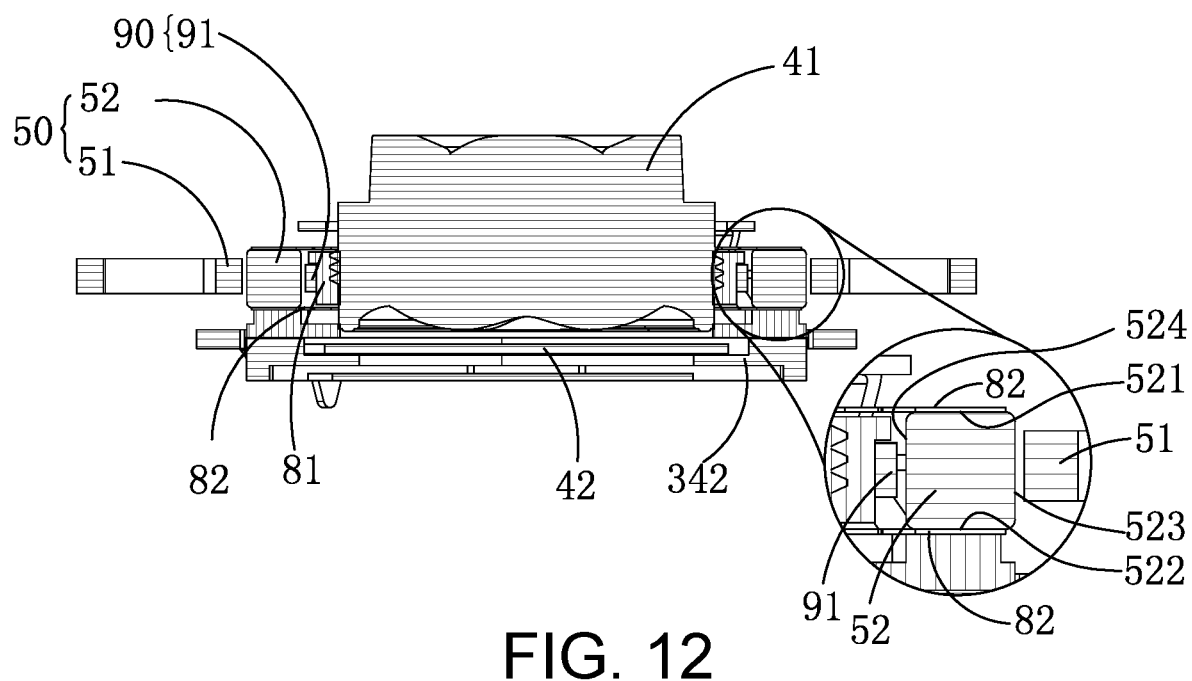
FIG. 12 is a cross-sectional view along line C-C of FIG. 12.

FIG. 7 is a perspective view of the camera device with optical image stabilization of FIG. 1 with the base and the housing removed. FIG. 8 is a partially exploded view of FIG. 7. FIG. 9 is a perspective view of the camera device with optical image stabilization of FIG. 7 with the frame body and the flexible circuit board removed. FIG. 10 is a perspective view of the camera device with optical image stabilization of FIG. 9 with the camera module carrying base removed. FIG. 11 is a top view of FIG. 9. FIG. 12 is a cross-sectional view along line C-C of FIG. 12. As shown in the figures, the optical lens 41 of the camera module 40 is disposed on the third carrying member 80. The first carrying member 20 comprises a first carrying member body 21 and a frame body 22 disposed on the first carrying member body 21. The second carrying member 30 is disposed in the frame body 22, which surrounds the second carrying member 30, the third carrying member 80, and the camera module 40. As shown in FIG. 8 and FIG. 9, the second carrying member 30 comprises a lower carrying body 31 swingably disposed at the first carrying member 20 around the first axis L1, an upper carrying body 32 swingably disposed at the lower carrying body 31 about the second axis L2, and a camera module carrying base 34 fixed to the upper carrying body 32. The third carrying member 80 is movably disposed in the camera module carrying base 34. The frame body 22 comprises two opposite first installation grooves 221. Two first supporting parts 311 of the lower carrying body 31 are inserted in the first installation groove 221 to form a structural configuration in which the lower carrying body 31 and the upper carrying body 32 could swing around the first axis L1. An upper surface of the lower carrying body 31 comprises two second installation grooves 312. The second installation grooves 312 and the first supporting parts 311 are alternately arranged on four side edges of the lower carrying body 31. Two second supporting parts of the upper carrying body 32 are inserted in the second installation grooves 312 to form a structural configuration in which the upper carrying body 32 could swing around the second axis. The third carrying member 80 is disposed on the camera module carrying base 34. The optical lens 41 disposed on the third carrying member 80 swings about the first axis L1 and the second axis L2 along with the lower carrying body 31 and the upper carrying body 32. As shown in FIG. 9, the camera module carrying base 34 comprises an upper carrying base 341 and a lower carrying base 342. The upper carrying body y 32 is fixed to the top side of the upper carrying base 341. The lower carrying base 342 is connected with a bottom side relative to the top side of the upper carrying base 341. The lower carrying body 31 surrounds the lower carrying base 342. The third carrying member 80 is disposed in the upper carrying base 341. The image sensor 42 is disposed in the lower carrying base 342.

As shown in FIG. 8, FIG. 10, and FIG. 12, the first optical compensating component 50 comprises a first force interaction member 51 disposed at the first carrying member 20 and a second force interaction member 52 disposed at the second carrying member 30. The first force interaction member 51 is force-interacted with the second force interaction member 52 to move the second carrying member 30 along the first axis L1 or/and the second axis L2 intersecting with the optical axis of the optical lens 41 to optically compensate for the optical lens 41. In this embodiment, the first force interaction member 51 is a coil, and the second force interaction member 52 is a permanent magnet. As shown in FIG. 8, the first force interaction member 51 is disposed in the frame body 22 of the first carrying member 20. The first force interaction member 51 is a triangular coil, which can be positioned in the frame body 22 by matching with the structural configuration of four corner parts of the frame body 22. As shown in FIG. 9, the second force interaction member 52 is disposed at the upper carrying base 341 comprising an opening 3411 penetrating a side surface of the upper carrying base 341. The second force interaction member 52 is disposed at the opening 3411. shown in FIG. 10 and FIG. 11, the four second force interaction members 52 and the first force interaction members 51 are correspondingly disposed. When an electric current passes through the first force interaction member 51, magnetic fields in different magnetic force directions would be generated according to the direction of the electric current. The electric current would magnetically interact with the permanent magnet of the second force interaction member 52 to allow the second force interaction member 52 to be pushed in a different direction orthogonal to the second carrying member 30 according to the magnetic field generated by the first force interaction member 51. The optical lens 41 swings in the direction of the first axis L1 and/or the second axis L2 to realize four-axis optical compensation Through the aforementioned swinging configuration of the lower carrying body 31 and the upper carrying member 32.

Referring to FIG. 2 and FIG. 3 again, in this embodiment, the base 10 comprises a first carrying groove 11, a second carrying groove 12 disposed on two sides of the first carrying groove 11, a plurality of bosses 13, and a first guiding groove 71 disposed on two sides of the second carrying groove 12. The plurality of bosses 13 surround to form the first carrying groove 11. A gap exists between two adjacent bosses 13 to form a second carrying groove 12. The number of the first guiding grooves 71 is multiple and the plurality of first guiding grooves 71 are respectively disposed at the plurality of bosses 13. As shown in FIG. 3, the bottom surface of the first carrying member 20 corresponding to the base 10 is provided with a second guiding groove 72 corresponding to the first guiding groove 71. As shown in FIG. 3 and FIG. 6, a plurality of spheres 73 are disposed in the first guiding groove 71 and in the second guiding groove 72. When the first carrying member 20 and the base 10 are in relative motion, the spheres 73 could be rolling in the first guiding groove 71 and the second guiding groove 72 to realize a sliding assembly of the first carrying member 20 with the base 10. Meanwhile, since the spheres 73 are configured to be rolling in the first guiding groove 71 and the second guiding groove 72, the friction generated during the relative motion between the first carrying member 20 and the base 10 can be reduced, so that the first guiding groove 71, the second guiding groove 72, and the sphere 73 of the first carrying member 20 on the base 10 could form a guiding component 70. As shown in FIG. 2 and FIG. 3, the first guiding groove 71 and the second guiding groove 72 are arc-shaped. The center of the first guiding groove 71 and the center of the second guiding groove 72 are on the third axis L3 so that the first carrying member 20 is restricted by the combination configuration of the sphere 73 with the first guiding groove 71 and the second guiding groove 72 to be rotating around the third axis L3. The sphere 73 comprises two first spheres 731 and a second sphere 732 disposed between the two first spheres 731. The first sphere 731 is in contact with the first guiding groove 71 and the second guiding groove 72. The diameter of the second sphere 732 is less than the diameter of the first sphere 731. In this way, when the two first spheres 731 are rolling in the first guiding groove 71 and in the second guiding groove 72, the second sphere 732 between the two first spheres 731 could prevent the two first spheres 731 from direct contacting, thereby preventing the two first spheres 731 from contacting and being stuck.

As shown in FIG. 2 and FIG. 3, the second optical compensating component 60 comprises a third force interaction member 61 disposed at the base 10 and a fourth force interaction member 62 disposed at the first carrying member 20. The third force interaction member 61 is disposed in the second carrying groove 12 of the base 10. The guiding component 70 connects the base 10 and the first carrying member 20. As shown in FIG. 2, the third force interaction member 61 is a coil, and as shown in FIG. 3, the fourth force interaction member 62 is a permanent magnet. When electric current passes through the third force interaction member 61, magnetic fields in different magnetic force directions would be generated according to the direction of the current. The electric current would magnetically interact with the permanent magnet of the fourth force interaction member 62 to allow the fourth force interaction member 62 to be pushed in a direction different from the horizontal direction of the base 10 according to the magnetic field generated by the third force interaction member 61, and to allow the first carrying member 20 to be guided by the guiding component 70 to move on the base 10 around the third axis L3 parallel to the optical axis of the camera module 40 for optical compensation for the optical lens 41. The second optical compensating component 60 further comprises a Hall effect sensor 63 for detecting the position of the fourth force interaction member 62. In some embodiments, the Hall effect sensor 63 is disposed at the base 10 and is disposed among the third force interaction members 61. The coil of the third force interaction member 61 surrounds the Hall effect sensor 63.

In addition to the aforementioned magnetic interaction between the first force interaction member 51 and the second force interaction member 52 and the four-axis optical compensation of the optical lens 41 swinging in the direction of the first axis L1 and/or the second axis L2 orthogonal to the optical axis through the swinging configuration of the lower carrying body 31 and the upper carrying body 32, the fifth-axis optical compensation can be performed through the magnetic interaction between the third force interaction member 61 and the fourth force interaction member 62 and the first carrying member 20 guided by the guiding component 70 to move on the base 10 around the third axis L3 parallel to the optical axis of the camera module 40.

Figure 13:
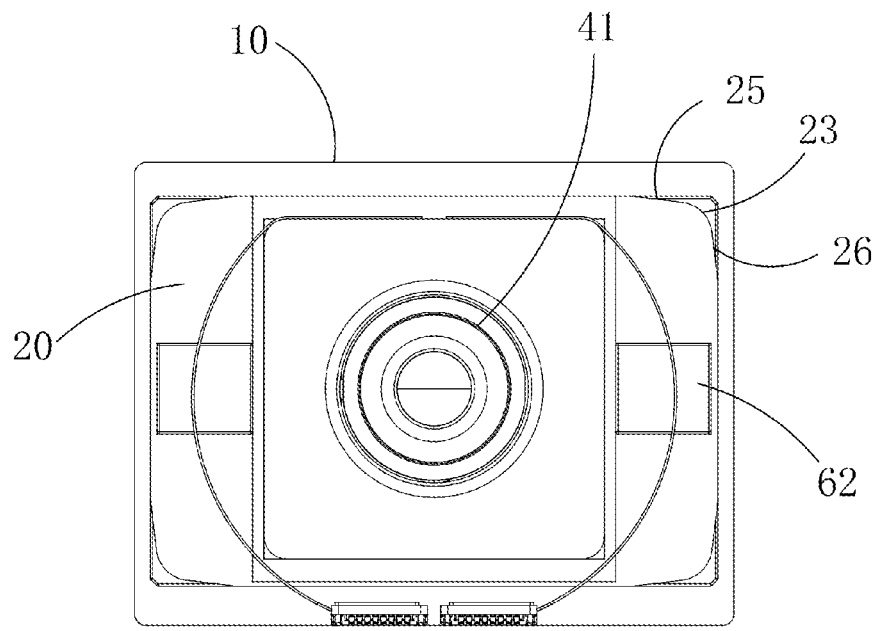
FIG. 13 is a schematic diagram showing the first carrying member of the camera device with optical image stabilization of FIG. 1 and the camera module carried on the first carrying member are disposed on a regular position of the base.
Figure 14:
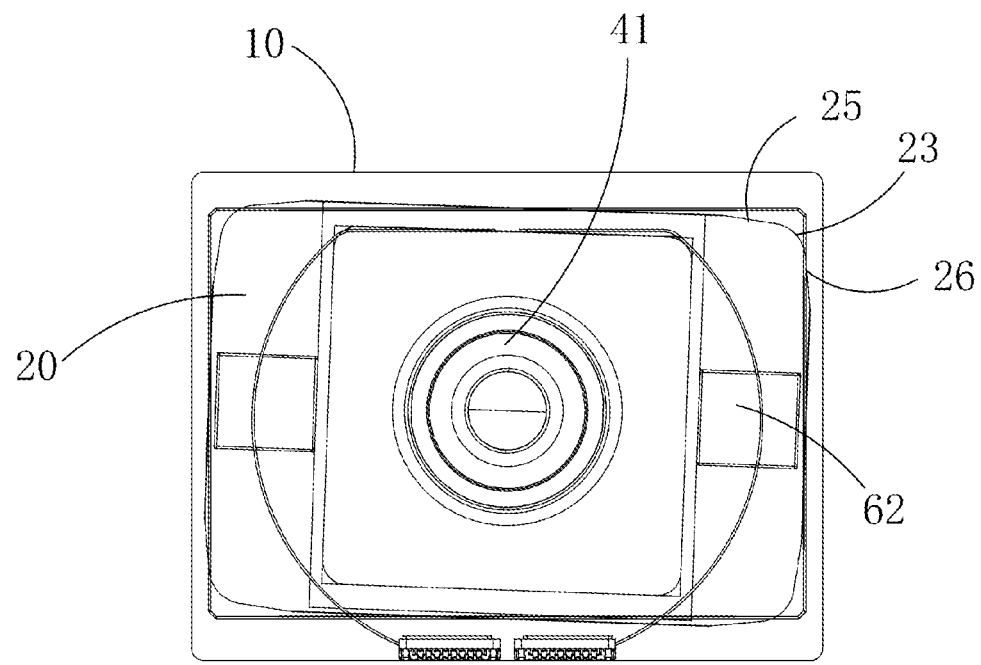
FIG. 14 is a schematic diagram showing the first carrying member of FIG. 13 and the camera module carried on the first carrying member rotating a minus 5 degrees about the third axis around the base.
Figure 15:
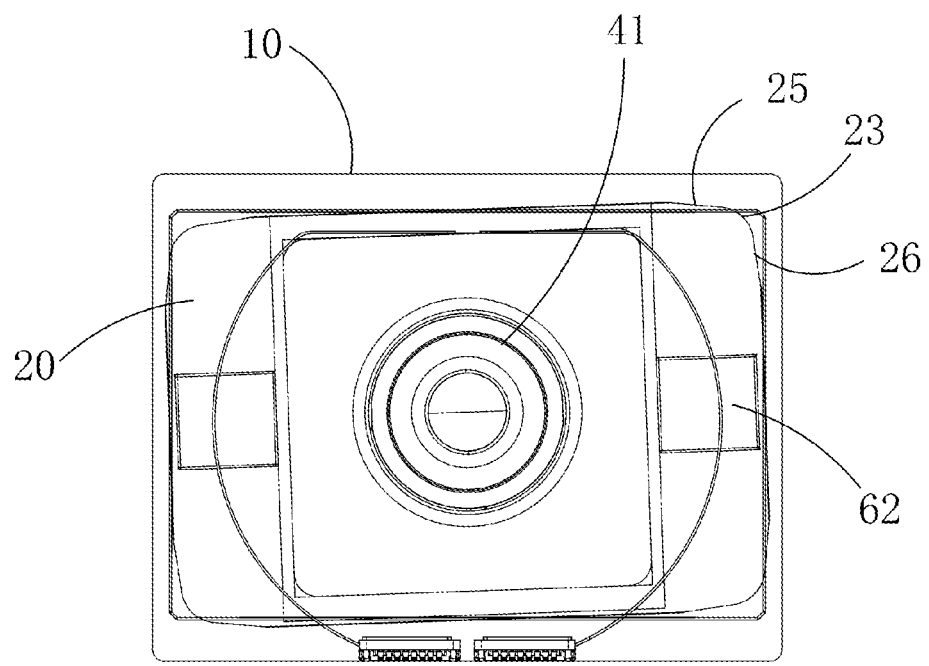
FIG. 15 is a schematic diagram showing the first carrying member of FIG. 13 and the camera module carried on the first carrying member rotating a 5 degrees about the third axis around the base.

FIG. 13 is a schematic diagram showing the first carrying member of the camera device with optical image stabilization of FIG. 1 and the camera module carried on the first carrying member are disposed on a regular position of the base. FIG. 14 is a schematic diagram showing the first carrying member of FIG. 13 and the camera module carried on the first carrying member rotating a minus 5 degrees about the third axis around the base. FIG. 15 is a schematic diagram showing the first carrying member of FIG. 13 and the camera module carried on the first carrying member rotating a 5 degrees about the third axis around the base. As shown in the figures, the first carrying member 20 rotates on the base 10 around the third axis L3 within a predetermined range of compensation angle. In this embodiment, the compensation angle range is between 5 degrees and minus 5 degrees. As shown in FIG. 1, a housing member 100 is further provided at the base 10 and surrounds the first carrying member 20. The first carrying member 20 comprises a corner part 23. On the part of two adjacent side edges 25 and 26 forming the corner part 23 close to the corner part 23 and other parts of the side edges 25 and 26 form an inclination angle. In this way, the first carrying member 20 does not interfere with the housing member 100 when it rotates within the aforementioned compensation angle. The side edges 25 and 26 of the first carrying member 20 close to the corner 23 are retracted.

In this way, the corner part 23 of the first carrying member 20 would not interfere with the housing member 100 even if the first carrying member 20 rotates within the above-mentioned range between 5 degrees and minus 5 degrees.

Thus, in addition to the conventional four-axis optical image stabilization, the camera device of the present disclosure could realize the fifth-axis optical compensation for performing the five-axis image stabilization.

Referring to FIG. 10 and FIG. 12 again, in this embodiment, the autofocus component 90 comprises a focusing force interaction member 91, which is disposed at the third carrying member 80. The third carrying member 80 comprises a third carrying member body 81 and an elastic support member 82. The optical lens 41 is disposed at the third carrying member body 81. The third carrying member body 81 of this embodiment is cylindrical. The optical lens 41 is screwed on an inner peripheral surface of the third carrying member body 81. The elastic support member 82 is connected with the third carrying member body 81 and the second force interaction member 52. The third carrying member 80 could be moving relative to the second force interaction member 52. In this embodiment, the focusing force interaction member 91 is a coil and is disposed at the third carrying member body 81 in a surrounding manner, which indicates that the coil of the focusing force interaction member 91 surrounds an outer peripheral surface of the cylindrical third carrying member body 81. The focusing force interaction member 91 and the first force interaction member 51 are disposed at opposite sides of the second force interaction member 52. As shown in FIG. 12, the second force interaction member 52 comprises an upper side 521 and a lower side 522 oppositely disposed in a direction along the optical axis, and a left side 523 and a right side 524 oppositely disposed in a direction orthogonal to the optical axis. The first force interaction member 51 corresponds to the left side 523 of the second force interaction member 52, and the focusing force interaction member 91 corresponds to the right side 524 of the second force interaction member 52.

As shown in FIG. 10, the number of the elastic support members 82 in this embodiment is at least two. The two elastic support members 82 are respectively connected with two opposite sides of the third carrying member body 81 and with two opposite sides of the second force interaction member 52 and are disposed at two opposite sides of the focusing force interaction member 91. The two elastic support members 82 are respectively connected with the upper side 521 and the lower side 522 of the second force interaction member 52, and the second force interaction member 52 is also sandwiched between the two elastic support members 82. The elastic support member 82 on the lower side is connected with a supporting plate 33 carrying the second force interaction member 52. When the image imaged on the image sensor 42 is blurred and auto-focusing is required, electric current would pass through the focusing force interaction member 91 to generate magnetic fields in different magnetic force directions according to the direction of the electric current. The electric current would magnetically interact with the permanent magnet of the second force interaction member 52, so that the focusing force interaction member 91 and the third carrying member body 81 could move back and forth along the direction of the optical axis of the optical lens 41 for autofocus.

Thus, the first optical compensating component 50 and the autofocus component 90 can share the second force interaction member 52, so that the number of parts could be reduced to allow the compensation and autofocus module to be less space occupied. In this way, cameras can be as much miniaturized for fitting in lightweight and compact mobile devices.

Figure 16:
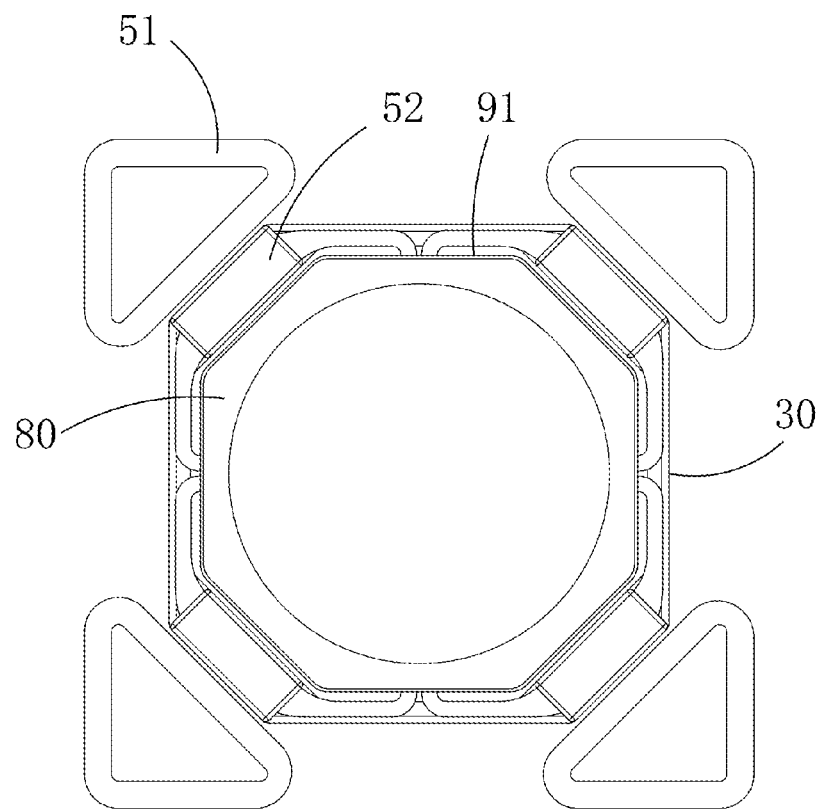
FIG. 16 is a top view of a structural configuration of the first optical compensating component with an autofocus component of the first embodiment.
Figure 17:
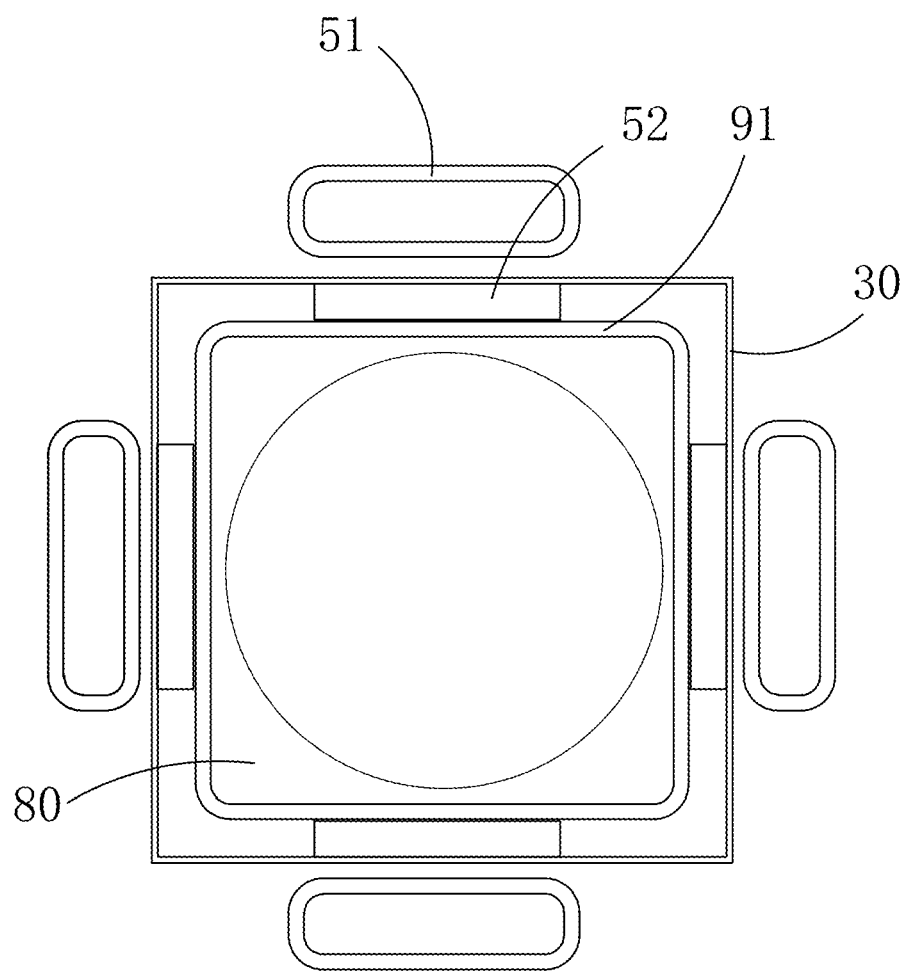
FIG. 17 is a top view of a structural configuration of the first optical compensating component with an autofocus component of the second embodiment.

FIG. 16 and FIG. 17 are top view of a structural configuration of the first optical compensating component with an autofocus component of the first and second embodiments. As shown in the figures, the shape and configuration of the first force interaction member 51 and the second force interaction member 52 of the first optical compensating component 50 can be different. As shown in FIG. 15, the first force interaction member 51 and the second force interaction member 52 are diagonally disposed at four corners of the first carrier 20 and four corners of the second carrier 30. The focusing force interaction member 91 octagonally surrounds the third carrying member 80. As shown in FIG. 15, the first force interaction member 51 and the second force interaction member 52 are disposed at four side edges of the first carrying member 20 and four side edges of the second carrying member 30. The focusing force interaction member 91 is square-shaped and surrounds the third carrying member 80.

Thus, it is necessary to control the direction of electric current of each of the coils for realizing the force interaction between the first force interaction member 51 and the second force interaction member 52, the force interaction between the third force interaction member 61 and the fourth force interaction member 62, and the focusing force interaction member 91 and second force interaction member 52. As shown in FIG. 7 and FIG. 8, a circuit module 110 is further provided for being connected with external electronic device and camera device. Control signals and power supply of the external electronic device could be used to control electric current direction of each of the coils by the circuit module for compensation and focus. The circuit module 110 surrounds the frame body 22 of the first carrying member 20. The circuit module 110 comprises a flexible circuit board 111 and an electrical connector 112 disposed on the flexible circuit board 111 (shown in FIG. 2). As shown in FIG. 8, the flexible circuit board 111 comprises a bottom plate part 1111 disposed on the second carrying member 30 and a surrounding part 1112 connected with the bottom plate part 1111 and surrounding the frame body 22. The bottom plate part 1111 is disposed in the second carrying member 30 and is electrically connected to the image sensor 42. The electrical connector 112 is disposed at the surrounding part 1112. The surrounding part 1112 comprises a first surrounding body 1113 and a second surrounding body 1114 respectively connected with the bottom plate part 1111. The first surrounding body 1113 and the second surrounding body 1114 extend around the frame body 22 in opposite directions. The rear sidewall of the frame body 22 away from the electrical connector 112 is provided with a through groove 222. The first surrounding body 1113 and the second surrounding body 1114 extend vertically from the through groove 222 at the rear part of the frame body 22 and surround the frame body 22 horizontally by keeping a gap distance with the frame body 22 without any contacting. The number of the electrical connectors 112 is two, which are respectively disposed at one end of the first surrounding body 1113 away from the bottom plate part 1111 and one end of the second surrounding body 1114 away from the bottom plate part 1111.

In the embodiments of the present disclosure, in the camera device with optical image stabilization, the second carrying member that carries the optical lens could move along the first axis or/and the second axis intersecting with the optical axis of the optical lens to compensate for the optical lens through the first optical compensating component, allowing the optical lens to move and rotate in and about the first axis and/or the second axis to realize a four-axis image compensation. The first carrying member is guided by the guiding component to rotate about the third axis parallel to the optical axis of the optical lens for the fifth axis image compensation through the second optical compensating component. Thus, in the present disclosure, images with excellent image quality can be output with a better image stabilization performed through extra compensation for the lens about additional axis than conventional four-axis image compensation.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A camera device with optical image stabilization, comprising:
    a base;
    a first carrying member slidably assembled to the base;
    a second carrying member movably assembled to the first carrying member;
    a camera module comprising an optical lens and an image sensor carried on the second carrying member;
    a first optical compensating component comprising a first force interaction member disposed on the first carrying member and a second force interaction member disposed on the second carrying member, the first force interaction member and the second force interaction member being configured to be force-interacted, allowing the second carrying member to move relative to the first carrying member to optically compensating for the optical lens;
    a second optical compensating component comprising a third force interaction member disposed on the base and a fourth force interaction member disposed on the first carrying member;
    a guiding component connected with the base and the first carrying member;
    wherein the third force interaction member and the fourth force interaction member are configured to be force-interacted, allowing the first carrying member to be guided by the guiding component to move on the base around an axis parallel to an optical axis of the optical lens to optically compensate for the optical lens.

2. The camera device with optical image stabilization according to claim 1, wherein the third force interaction member is a coil; the fourth force interaction member is a magnet.

3. The camera device with optical image stabilization according to claim 2, wherein the second optical compensating component comprises a Hall-effect sensor disposed on the base; the third force interaction member surrounds the Hall-effect sensor.

4. The camera device with optical image stabilization according to claim 1 comprising a housing member disposed on the base and surrounding the first carrying member, the first carrying member comprising a corner part, an inclination angle is formed between a part of two adjacent side edges of the first carrying member forming the corner part close to the corner part and other parts of the side edges.

5. The camera device with optical image stabilization according to claim 1, wherein the guiding component comprises a first guiding groove disposed at the base, a second guiding groove disposed at the first carrying member and corresponding to the first guiding groove, and at least one sphere disposed in the first guiding groove and the second guiding groove and in assembled to the base and the first carrying member.

6. The camera device with optical image stabilization according to claim 5, wherein the first guiding groove and the second guiding groove are arc-shaped; the axis parallel to the optical axis passes the center of the first guiding groove and the center of the second guiding groove.

7. The camera device with optical image stabilization according to claim 6, wherein the base comprises a first carrying groove, a second carrying groove, and a plurality of bosses; the plurality of bosses surround the first carrying groove; the second carrying groove is disposed between adjacent two of the plurality of bosses; the number of the first guiding grooves is multiple; the plurality of the first guiding grooves are respectively disposed on the plurality of bosses; the third force interaction member is disposed in the second carrying groove.

8. The camera device with optical image stabilization according to claim 7, wherein the sphere comprises two first spheres and a second sphere disposed between the two first spheres; the two first spheres are in contact with the first guiding groove and the second guiding groove; the diameter of the second sphere is less than the diameter of the two first spheres.

9. The camera device with optical image stabilization according to claim 8, wherein the third force interaction member is a coil; the fourth force interaction member is a magnet.

10. The camera device with optical image stabilization according to claim 9, wherein the second optical compensating component comprises a Hall-effect sensor disposed on the base; the third force interaction member surrounds the Hall-effect sensor.

11. The camera device with optical image stabilization according to claim 5, wherein the base comprises a first carrying groove, a second carrying groove, and a plurality of bosses; the plurality of bosses surround the first carrying groove; the second carrying groove is disposed between adjacent two of the plurality of bosses; the number of the first guiding grooves is multiple; the plurality of the first guiding grooves are respectively disposed on the plurality of bosses; the third force interaction member is disposed in the second carrying groove.

12. The camera device with optical image stabilization according to claim 5, wherein the sphere comprises two first spheres and a second sphere disposed between the two first spheres; the two first spheres are in contact with the first guiding groove and the second guiding groove; the diameter of the second sphere is less than the diameter of the two first spheres.

13. The camera device with optical image stabilization according to claim 1 comprising a circuit module, the first carrying member comprising a first carrying member body and a frame body disposed on the first carrying member body and surrounding the camera module and the second carrying member, the circuit module comprising a flexible circuit board surrounding the frame body and an electrical connector disposed at one end of the flexible circuit board and disposed at the outside of the frame body, the circuit module being electrically connected with the image sensor.

14. The camera device with optical image stabilization according to claim 13, wherein the flexible circuit board comprises a bottom plate part disposed in the first carrying member and a surrounding part connected with the bottom plate part and surrounding the frame body; the electrical connector is disposed at one end of the surrounding part away from the bottom plate part.

15. The camera device with optical image stabilization according to claim 14, wherein the frame body comprises a through groove; the bottom plate part is disposed in the frame body; the surrounding part comprises a first surrounding body and a second surrounding body respectively connected with the bottom plate part; the first surrounding body and the second surrounding body pass through the through groove and extend around the frame body along opposite directions; the number of the electrical connectors is two; the two electrical connectors are respectively disposed at one end of the first surrounding body away from the bottom plate part and one end of the second surrounding body away from the bottom plate part.

* * * * *